United States Patent [19]

McPeak et al.

[11] Patent Number: 4,570,953
[45] Date of Patent: Feb. 18, 1986

[54] STAIR-CLIMBING HAND TRUCK

[75] Inventors: Ercel W. McPeak; Theodore Felzer, both of Appleton, Wis.; Frederick J. Rodgers, San Jose, Calif.

[73] Assignee: Ultra Lift Corporation, San Jose, Calif.

[21] Appl. No.: 471,109

[22] Filed: Mar. 1, 1983
(Under 37 CFR 1.47)

[51] Int. Cl.⁴ .............................................. B62B 5/02
[52] U.S. Cl. .................................. 280/5.3; 280/47.29
[58] Field of Search ................. 280/5.3, 47.29, 47.17, 280/47.24, 47.28; 310/92, 78, 100; 192/56 R, 2 R; 180/8.2; 187/17, 9 R; 414/490; 254/7 R, 7 B, 76, 98; 81/479

[56] References Cited

U.S. PATENT DOCUMENTS

| | | | |
|---|---|---|---|
| 2,412,630 | 5/1945 | Nelson | 192/56 R |
| 2,608,258 | 4/1948 | Jenkins | 280/5.3 |
| 2,771,804 | 5/1955 | Better et al. | 192/56 R |
| 3,064,990 | 11/1962 | Salvucci | 280/47.24 |
| 3,515,401 | 11/1968 | Gross | 180/8.2 |
| 3,663,033 | 11/1970 | Story | 280/47.17 |
| 3,907,138 | 7/1973 | Rhodes | 280/5.3 |
| 3,941,213 | 2/1974 | Stammen | 187/9 R |
| 3,997,182 | 12/1976 | Mortenson | 280/47.27 |
| 3,998,476 | 9/1975 | Kazmark | 280/47.24 |
| 4,284,286 | 8/1979 | Lewallen | 280/42.28 |

Primary Examiner—Joseph F. Peters, Jr.
Assistant Examiner—Everett G. Diederiks, Jr.
Attorney, Agent, or Firm—Townsend & Townsend

[57] ABSTRACT

A hand truck for powered raising and lower of an extremely heavy load comprises first and second frame members constructed of aluminum and mounted for relative longitudinal reciprocating movement. One of the members has a lip attached thereto for positioning the load thereon. The frame members are coupled by means for actuating the relative longitudinal movement. The actuation means is powered by a selectively engageable electric motor. Overload release clutch means is interposed between the motor and the actuation means to decouple the motor and actuation means whenever the load exceeds a predetermined amount.

4 Claims, 3 Drawing Figures

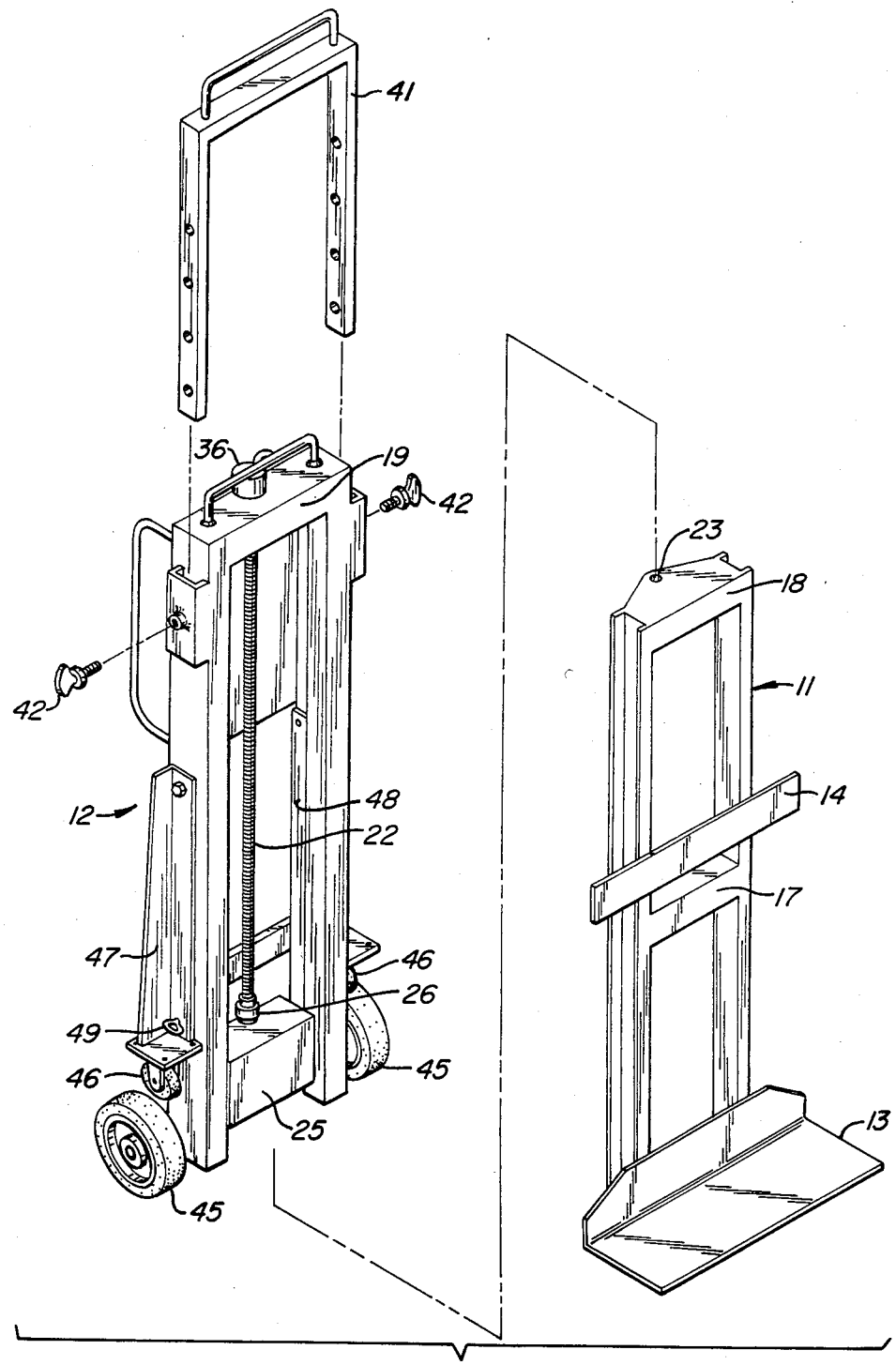
FIG._1.

U.S. Patent  Feb. 18, 1986  Sheet 2 of 2  4,570,953
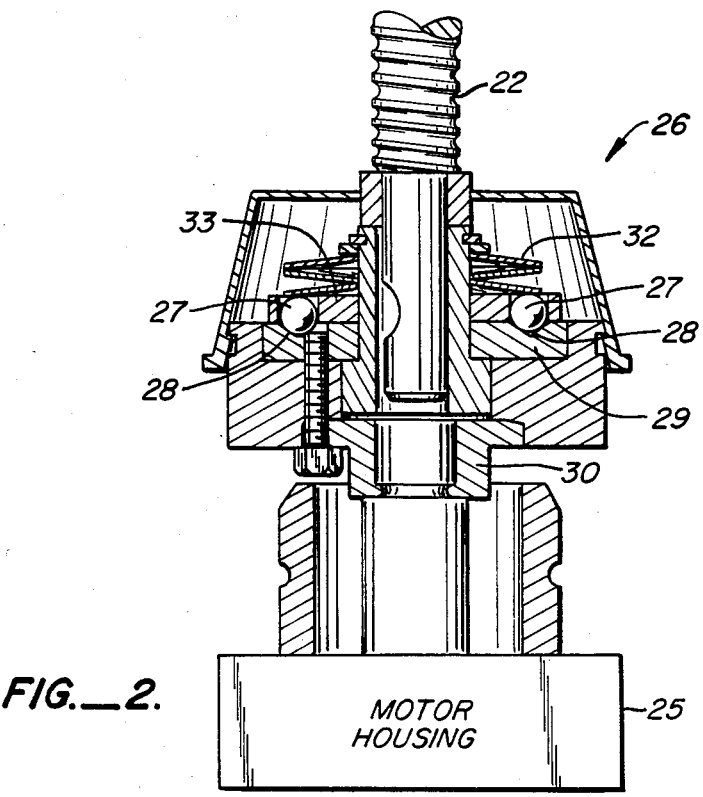
FIG._2.
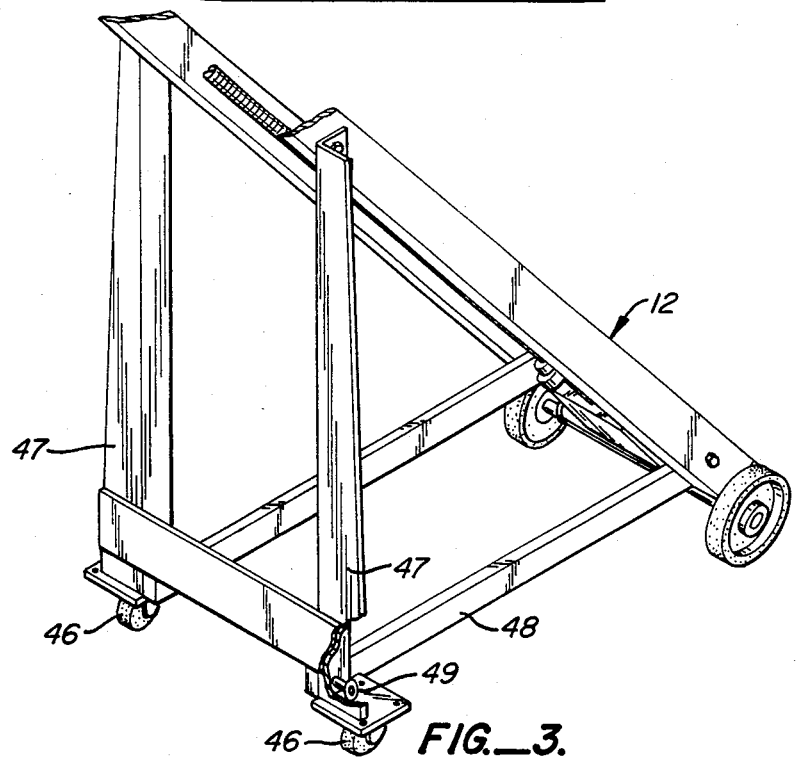
FIG._3.

STAIR-CLIMBING HAND TRUCK

BACKGROUND OF THE INVENTION

The invention relates to stair-climbing hand trucks or dollies which are powered for raising and lowering heavy loads.

Various hand trucks are known which are structured for facilitating the movement of a heavy load up and down stairs, over curbs and the like, and onto and off of an elevated platform. Typical stair-climbing hand trucks are disclosed in U.S. Pat. Nos. 2,192,396, 2,904,201, and 3,907,138. Such hand trucks typically comprise a main frame member and a secondary frame member which are telescopically or otherwise slidably mounted so that the secondary frame can move upward and downward on the main frame. The load to be moved is supported on one frame and the dolly wheels are supported on the other. Then, the load can be raised or lowered with respect to the wheels which are fixed on the edge of a step or platform. Alternatively, the frame member supporting the wheels can be raised or lowered with respect to the load-supporting member resting on a step, thereby hooking the wheels over a higher or lower step. By alternately carrying out these two relative motions of the frame members, a load can be manipulated over otherwise insurmountable obstacles.

Known hand trucks are commonly powered by an electric motor to enable relative movement of the two frame members even when a large, heavy and bulky load is supported thereon. Although the motor enables one to raise and lower a large bulky load, such loads are nevertheless difficult to maneuver and wheel around and require delicate balance and constant attention of the operator. Furthermore, the frame members themselves must be made of a heavier steel construction to support the increased weight made possible by the use of an electric motor. The unloaded hand truck by itself is thus significantly heavier, which only adds to the care which must be observed when manipulating a bulky load.

In addition, problems have been experienced with the electric motors used to power stair-climbing hand trucks. If the motor is not powerful enough, it will burn out when the operator attempts to raise too heavy a load. Since hand truck operators do not generally weigh their intended cargoes before loading onto a hand truck, burnout is the inevitable fate of such electric motors. Attempts have been made to counter this problem by installing motors powerful enough to raise any load within reason. Motors such as these, however, tend to cause jamming or damage to structural elements of the hand truck when the members are fully extended or fully retracted and the motor is not disengaged in time. When manipulating bulky, heavy objects in confined spaces, a hand truck operator is frequently unable to see when the frame members are becoming dangerously overextended.

The difficulty of maneuvering heavy loads gracefully, which is exacerbated by the weight of the unloaded hand truck itself, and the possibility of damage to the hand truck from over extension or burnout of the motor while a heavy load is being maneuvered presents a serious safety hazard to the hand truck operator.

SUMMARY OF THE INVENTION

The present invention provides a powered stair-climbing hand truck which is much lighter than conventional hand trucks, yet capable of handling extremely heavy loads with much greater facility and security than with convention hand trucks. It is an object of the present invention to provide a hand truck which cannot be damaged by over extension or over retraction. It is a further object of the invention to provide a hand truck powered by a motor which will not be caused to burn out when an excess load is being supported. It is yet a further object of the invention to provide an especially lightweight hand truck structured for easy and safe maneuverability even when carrying an extremely heavy load.

A hand truck constructed in accordance with the invention comprises, briefly, a pair of aluminum frame members which are mounted for relative longitudinal reciprocating movement between two stop points. One of the members is formed with a lip for supporting a load thereon. Actuation means, powered by a selectively engageable electric motor, couples the frame members together for actuating relative longitudinal movement thereof. Overload release clutch means couples the motor and the actuation means for raising and lowering an extremely heavy load positioned by the lip on the frame members; the overload release clutch means decouples the motor and the actuation means whenever the load exceeds a predetermined amount and also whenever the frame members reach the stop points, which are at positions of extreme extension or retraction.

A further understanding and appreciation of the scope and advantages of the invention may be gained from the following portions of the specification and attached drawings.

BRIEF DESCRIPTION OF THE DRAWINGS

FIG. 1 is an exploded perspective view of a hand truck constructed in accordance with the present invention.

FIG. 2 is a cross-sectional view of clutch means adapted for use with the present invention.

FIG. 3 shows a perspective view of the auxiliary support and brace members in deployed configuration.

DETAILED DESCRIPTION OF THE PREFERRED EMBODIMENTS

A hand truck constructed in accordance with the present invention comprises a first frame member 11 and a second frame member 12, which are mounted for relative longitudinal reciprocating movement with respect to one another. As seen in FIG. 1, frame members 11 and 12 are of U-channel construction, and member 11 is set within the interior region of member 12 to allow telescoping extension or contraction of the frame. A narrow supporting platform in the form of lip 13 is attached to member 11 at its lower extremity. Cross member 14 is secured to frame 11 at an intermediate position. A load to be carried by the hand truck is positioned on lip 13 and rests against cross member 14. To provide better support and reduce the need for critical alignment of a heavy, wide load positioned on the hand truck, cross member 14 is advantageously formed to reach in a lateral direction significantly beyond the frame members 11 and 12. The cross member 14 may also accommodate a strap fixed to one end of cross member 14 and a strap bar with offset locking cam mounted at the other end to enable the hand truck operator to secure a wide, bulky load to the hand truck.

To accommodate heavy loads, hand trucks in the past have required a heavy steel construction. Notwithstanding the fact that the added weight of the hand truck impedes maneuverability, the steel construction has nevertheless been felt necessary, either because other materials could not provide the strength with any savings in weight or because of the difficulty in welding or otherwise working with other materials. In the present invention, frame members 11 and 12 are formed of aluminum alloy. The aluminum construction provides up to a 50% savings in weight over prior art hand trucks. Although aluminum is well known for its light-weight nature, it has heretofore never been utilized in heavy duty hand trucks and dollies. In the preferred embodiment, frame members 11 and 12 are formed of extruded aluminum. This gives the frame members a unitary construction, greatly eliminating the need for welding, and giving an equivalent strength with less aluminum. Even though the need for welds is greatly reduced, it is nevertheless advantageous not to use, pure aluminum but rather a weldable alloy such as 6061 or 6072. For example, in FIG. 1 cross members 17, 18 and 19 are welded to the side portions of the frame members.

Frame members 11 and 12 are coupled together by actuation means for actuating the relative longitudinal movement thereof. In the preferred embodiment the actuation means comprises threaded shaft 22 which is supported at one end by a bearing mounted in cross member 19. The shaft 22 extends through a threaded collar 23 mounted in cross member 18 of frame member 11. As shaft 22 rotates about its axis, member 11 will be raised or lowered with respect to member 12.

The opposite end of shaft 22 is driven by an electric motor imposed within housing 25. In the past, the actuation means has been driven directly by the motor. In the present invention, an overload release clutch 26 is interposed between the motor and shaft 22. In a preferred embodiment the overload clutch is of the ball-detent type shown in FIG. 2. A plurality of balls 27 are disposed within sockets 28 formed in annular member 29, which is secured to the drive shaft of the electric motor through coupling 30. The tension of compressional spring 32 holds the balls 27 in their respective sockets 28. Torque generated by the motor is transmitted through balls 27 to friction disc 33 and thereafter to shaft 22. The torque is transmitted to balls 27 by contact with the conical sides of sockets 28. The sloping sides pressing against the balls 27 exert both an upward component of force and a lateral one. If the upward component is too great, then spring 32 releases to allow balls 27 to leave the sockets. This allows the clutch to slip. The point at which the clutch slips depends upon the load on spring 32, i.e., on the load carried by the hand truck, and upon the spring constant. Therefore, the load at which the load will slip can be adjusted by adjusting spring 32. Similarly, when frame members 11 and 12 are extended to a stop point, that is, a point beyond which the relative movement of the frame members is obstructed, an additional load will be placed on spring 32, which will cause clutch 26 to slip. The ball-detent type of clutch is preferable in that the ball and socket arrangement provides an audible warning sound whenever clutch 26 starts to slip.

An end of shaft 22 terminates within brake mechanism 36 mounted on cross member 19. Brake mechanism 36 is of the type which will cause a spring or strap to wrap around shaft 22 and stop any unpowered rotation of the shaft in the downward-turning direction. Mechanisms of this type are well known in the art.

It is generally recognized that the heavy, bulky load positioned on a hand truck requires delicate balance to maneuver under control. It has not generally been appreciated, however, that the control can be considerably enhanced by extending the length of frame member 12 beyond the height of the cargo. For this purpose the hand truck of the present invention is provided with bracket 41 which is selectively and securely positioned on the end of frame member 12 by lock screws 42.

For maneuvering extremely heavy loads, the present invention provides a highly reliable retractable auxiliary support "tripod" with auxiliary wheels attached thereto. Although the hand truck is normally maneuvered on the main wheels 45, auxiliary wheel or casters 46 attached to auxiliary support member 47 at one end enables one to maneuver a bulky load much more safely. Member 47 is pivotally mounted to frame member 12 at the other end. Brace member 48 is also pivotally mounted to frame member 12 at one end and connected to support member 47 through releasable locking means, such as lock pins 49. It has been found necessary to extend the lock pin 49 through apertures in both the support member 47 and the brace member 48 proximate the auxiliary wheel or caster 46. Other means of connection, less reliable than the lock pin, have been found to release accidentally while maneuvering with heavy loads, presenting a dangerous condition.

With the hand truck of the present invention loads on the order of 1000 pounds to 1500 pounds can be handled safely by a single operator.

While the above provides a full and complete description of the preferred embodiment of the present invention, various modifications and alterate constructions will occur to one skilled in the art, given the benefit of this disclosure. Such modifications and alternate constructions are considered to fall within the spirit and scope of the invention disclosed herein and defined by the appended claims.

What is claimed is:

1. A hand truck for powered raising and lowering of a heavy load comprising:
   first and second aluminum frame members formed in a unitary construction of extruded aluminum and mounted for relative longitudinal reciprocating movement between two stop points, said first member having a lip attached thereto for positioning a load thereon;
   actuation means coupled to said frame members for actuating relative longitudinal movement thereof, said actuation means being powered by a selectively engageable electric motor;
   overload release clutch means coupling said motor and said actuation means for raising and lowering a load positioned by said lift on said frame members, said overload release clutch means decoupling said motor and said actuation means whenever said load exceeds a predetermined amount of at least about 1000 pounds and also whenever said frame members reach said stop points; and
   said an audible warning sound whenever said load exceeds said predetermined amount and whenever said frame members reach said stop points.

2. The hand truck of claim 1, wherein said actuation means comprises a threaded shaft coupled to said second frame member for rotation about the shaft axis and extending through a threaded collar fixed to said first frame member; and said overload release clutch means comprises a ball-detent clutch coupling said threaded shaft to said electric motor.

3. The hand truck of claim 1, wherein said second frame member has a pair of wheels at an extremity thereof, and said hand truck further comprises a support member and a brace member, both pivotally mounted to one of said frame members, said support member having at least one auxiliary wheel at an extremity thereof, and releasable locking means extending through apertures in said support and brace members proximate said at least one auxiliary wheel for securely fastening said support and brace members to one another.

4. The hand truck of claim 3, further comprising a bracket selectively and securely positionable at an end of said second frame member for selectively extending the length thereof, thereby to provide greater leverage for manipulating a heavy load.

* * * * *